United States Patent [19]

Zakman

[11] Patent Number: 4,876,552

[45] Date of Patent: Oct. 24, 1989

[54] INTERNALLY MOUNTED BROADBAND ANTENNA

[75] Inventor: Zdravko M. Zakman, Schaumburg, Ill.

[73] Assignee: Motorola, Inc., Schaumburg, Ill.

[21] Appl. No.: 186,545

[22] Filed: Apr. 27, 1988

[51] Int. Cl.⁴ .......................... H01Q 1/24; H04B 1/40

[52] U.S. Cl. .......................... 343/702; 343/846; 455/89

[58] Field of Search ................ 343/700 MS, 702, 725, 343/822, 829, 830, 848, 905, 847, 846; 455/84, 89, 90

[56] References Cited

U.S. PATENT DOCUMENTS

| | | | |
|---|---|---|---|
| 3,049,711 | 8/1962 | Hooper | 343/702 |
| 3,573,628 | 4/1971 | Cramer et al. | 325/361 |
| 3,736,591 | 5/1973 | Rennels et al. | 343/702 |
| 4,123,756 | 10/1978 | Nagata et al. | 343/702 |
| 4,313,119 | 1/1982 | Garay et al. | 343/702 |
| 4,471,493 | 9/1984 | Schober | 455/90 |
| 4,491,843 | 1/1985 | Boubouleix | 343/702 |
| 4,494,120 | 1/1985 | Garay | 343/702 |
| 4,516,127 | 5/1985 | Siwiak | 343/702 |
| 4,571,595 | 2/1986 | Phillips et al. | 343/745 |
| 4,591,863 | 5/1986 | Patsiokas | 343/702 |
| 4,625,212 | 11/1986 | Oda et al. | 343/702 |
| 4,628,322 | 12/1986 | Marko et al. | 343/702 |
| 4,641,366 | 2/1987 | Yokoyama et al. | 455/89 |
| 4,661,992 | 4/1987 | Garay et al. | 455/89 |
| 4,672,685 | 6/1987 | Phillips et al. | 455/89 |
| 4,701,763 | 10/1987 | Yamamoto et al. | 343/700 MS |
| 4,721,962 | 1/1988 | Gorzel | 343/702 |
| 4,723,305 | 2/1988 | Phillips et al. | 455/89 |

FOREIGN PATENT DOCUMENTS

| | | |
|---|---|---|
| 77724 | 5/1984 | Japan . |
| 47502 | 3/1985 | Japan . |
| 47522 | 3/1985 | Japan . |
| 48626 | 3/1985 | Japan . |
| 100841 | 6/1985 | Japan . |
| 200702 | 9/1986 | Japan . |
| 2134734 | 2/1986 | United Kingdom . |

OTHER PUBLICATIONS

Kobayashi et al., "Detachable Mobile Radio Units for the 800 MHz Land Mobile Radio System", IEEE, 1984, pp. 6–11.

Taga et al., "A Built-In Antenna for 800 MHz Band Portable Radio Units", Proceedings of ISAP, pp. 425–428, 1985.

Yokoyama et al., "Dual-Resonance Broadband Microstrip Antenna", Proceedings of ISAP, pp. 429–432, 1985.

Kuboyama et al., "Post Loaded Microstrip Antenna for Pocket Size Equipment at UHF", Proceedings of ISAP, pp. 431–435, 1985.

Pozar et al., "An Aperture Coupled Microstrip", IEEE Transactions on Antennas and Propagation, Vo. AP-35, No. 6, pp. 728-731, June, 1987.

Buck et al., "Aperture Coupled Microstrip Antenna with a Perpendicular Feed", Electronics Letters, Jan. 30, 1986, Vol. 22, No. 3, pp. 125-126.

*Primary Examiner*—J. Carroll
*Assistant Examiner*—Doris J. Johnson
*Attorney, Agent, or Firm*—Raymond A. Jenski; Rolland R. Hackbart

[57] ABSTRACT

An internally mounted broadband antenna utilizing two resonators and a reactive ground feed is disclosed. A nonconductive notch separates a conductive surface into two portions which are coupled to a respective one of each resonator. Each resonator is a microstrip conductor forming a transmission line with its respective conductive surface portion. Coupling to the antenna is accomplished by connection across the notch.

8 Claims, 5 Drawing Sheets

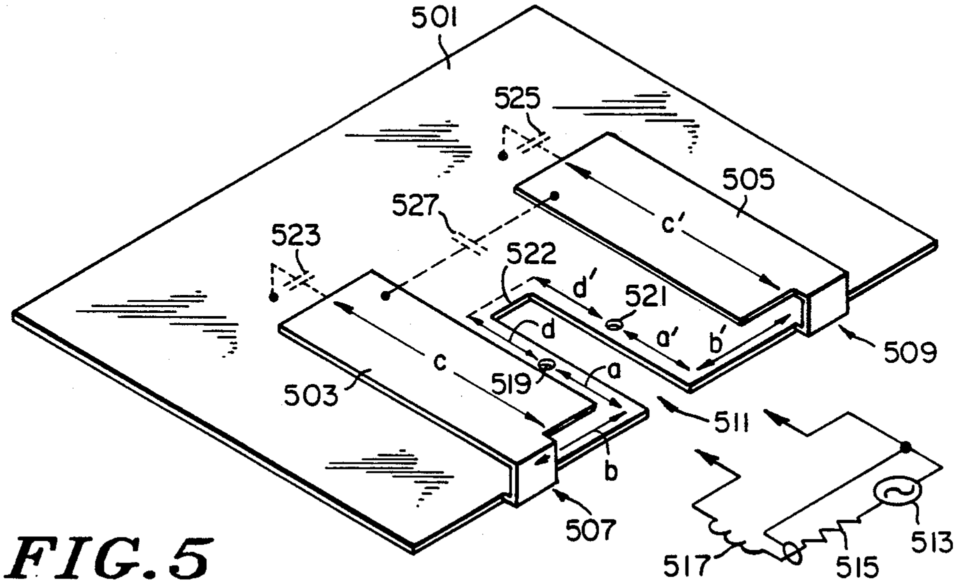
FIG. 5
FIG. 4
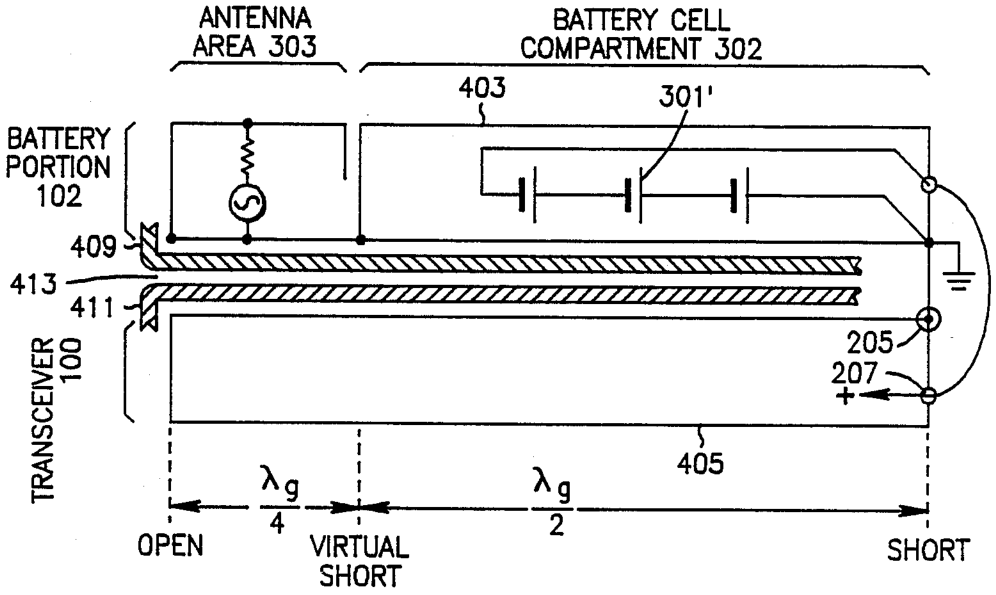

INTERNALLY MOUNTED BROADBAND ANTENNA

BACKGROUND OF THE INVENTION

This invention relates generally to small internal transceiver antennas and more particularly to a broadband antenna mounted within a detachable battery for a portable or handheld transceiver. This invention is related to U.S. Patent Application No. 186,845 "Detachable Battery Pack with a Built-In Broadband Antenna", filed on the same date as the present invention on behalf of Zakman, et al. and assigned to the assignee of the present invention.

Portable transceivers generally utilize an external projecting antenna which is a convenient fraction of a wavelength in order to provide nearly optimum radiation of transmitter energy and reception of received energy. Such an external antenna, however, is subject to breakage or can make the portable transceiver awkward to handle. Therefore, some portable transceiver antennas have been made retractable and some antenna have been built into the portable transceiver. Antennas which have been located within the housing of the transceiver (an "internal antenna") have resolved the aforementioned problems but because of size limitations and positioning within the transceiver, have yielded a compromised performance over the external antenna. Improved performance has been realized in internal antennas as described in U.S. Pat. No. 4,672,685, "Dual Band Antenna Having Separate Matched Inputs of Each Band" and in U.S. Pat. No. 4,723,305, "Dual Band Notch Antenna For Portable Radiotelephones".

SUMMARY OF THE INVENTION

It is, therefore, one object of the present invention to incorporate a miniaturized high efficiency duplex antenna within a detachable battery housing of a portable transceiver.

It is another object of the present invention to utilize a dual resonator structure to provide wide bandwidth of operation necessary for duplex transceiver use.

It is a further object of the present invention to couple the broadband antenna to the receiver and transmitter of the transceiver by a notch reactive ground feed.

Accordingly, these and other objects are realized in the present invention which encompasses a broadband reactive ground feed antenna which utilizes a conductive surface having a notch separating the conductive surface into two portions. Each portion is coupled to a respective first and second microstrip resonator at the edge of the conductive surface. The transceiver is coupled to the conductive surface portions at a two-point antenna feed located at symmetrically opposite sides of the notch.

BRIEF DESCRIPTION OF THE DRAWINGS

FIG. 4 is a diagram of the portable radiotelephone of FIG. 1 illustrating the electrical relationships of the battery portion to the transceiver portion of the present invention.

FIG. 5 is a simplified diagram of a miniaturized, internally mounted broadband antenna which may employ the present invention.

DESCRIPTION OF THE PREFERRED EMBODIMENT

Figure 1:
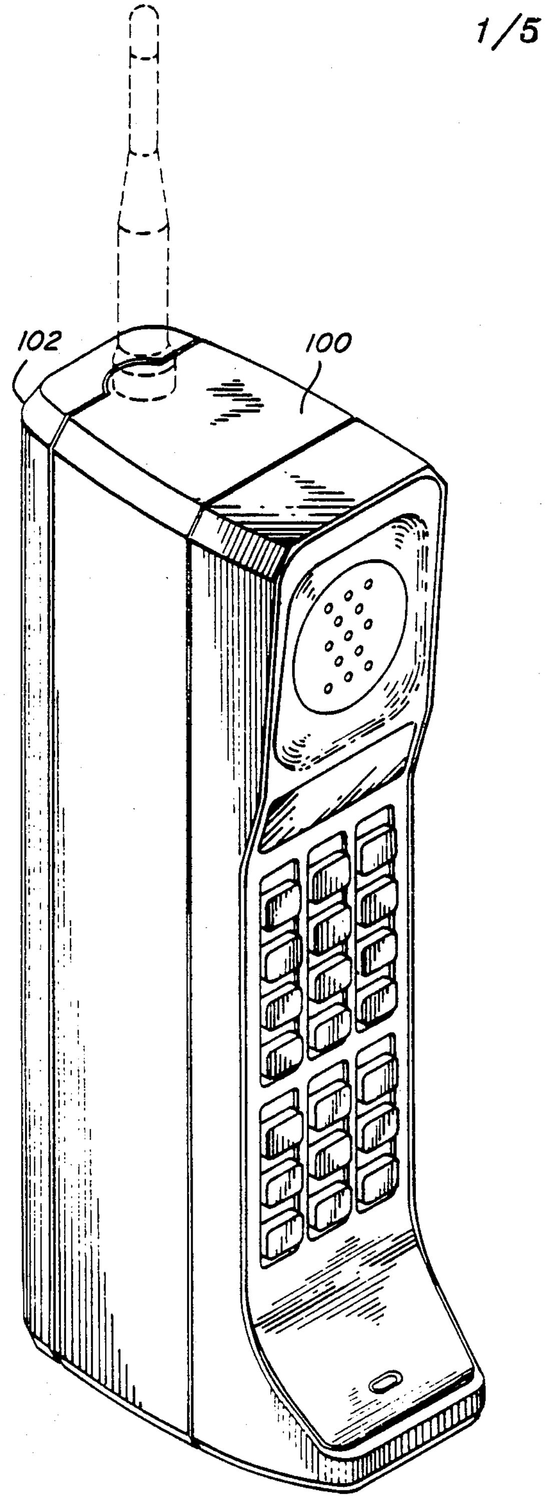
FIG. 1 is an isometric view of a portable radiotelephone which may employ the present invention.

A hand-held transceiver such as that shown in FIG. 1 is a portable radiotelephone transceiver 100 which may beneficially employ the present invention. Such a transceiver may be similar to that described in Instruction Manual 68P81071E55 "Dyna T*A*C* Cellular Portable Telephone" available from Motorola, Inc. Technical Writing Services, 1301 E. Algonquin Rd., Schaumburg, Ill. A cellular portable radiotelephone of this nature generally is equipped with an external antenna to enable radio transmission and reception. This antenna typically can be unscrewed and removed from a connector on the top surface of the radio telephone transceiver 100.

Portable cellular telephones also generally have a detachable battery portion 102 so that a freshly charged battery may be attached to the portable telephone transceiver 100 while a discharged battery can be placed into an external charger (not shown) for recharging. Additionally, a portable transceiver similar to that of FIG. 1 may be connected to an appropriate mating part in a vehicle (when the battery portion 102 is detached) to obtain power from the vehicle and to make use of a vehicularly mounted antenna. To do so requires that there be connections for both external power and antenna within the transceiver 100. Such connections are shown in FIG. 2.

Figure 2:
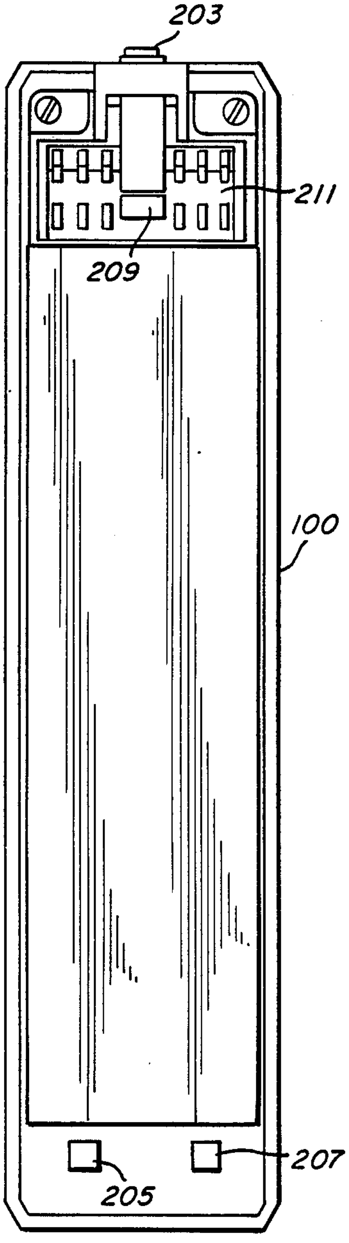
FIG. 2 is a view of the rear of the radiotelephone of FIG. 1 in which the battery portion has been detached.

A rear elevation view of the portable transceiver 100 of FIG. 1 is shown in FIG. 2 with the battery portion 102 detached from the transceiver 100. In. FIG. 2 the removable antenna has been removed, exposing the external antenna connector 203. In this view with the battery portion 102 removed, power connectors 205 and 207, internal antenna connector 209, and control connector 211 are exposed.

Figure 3:
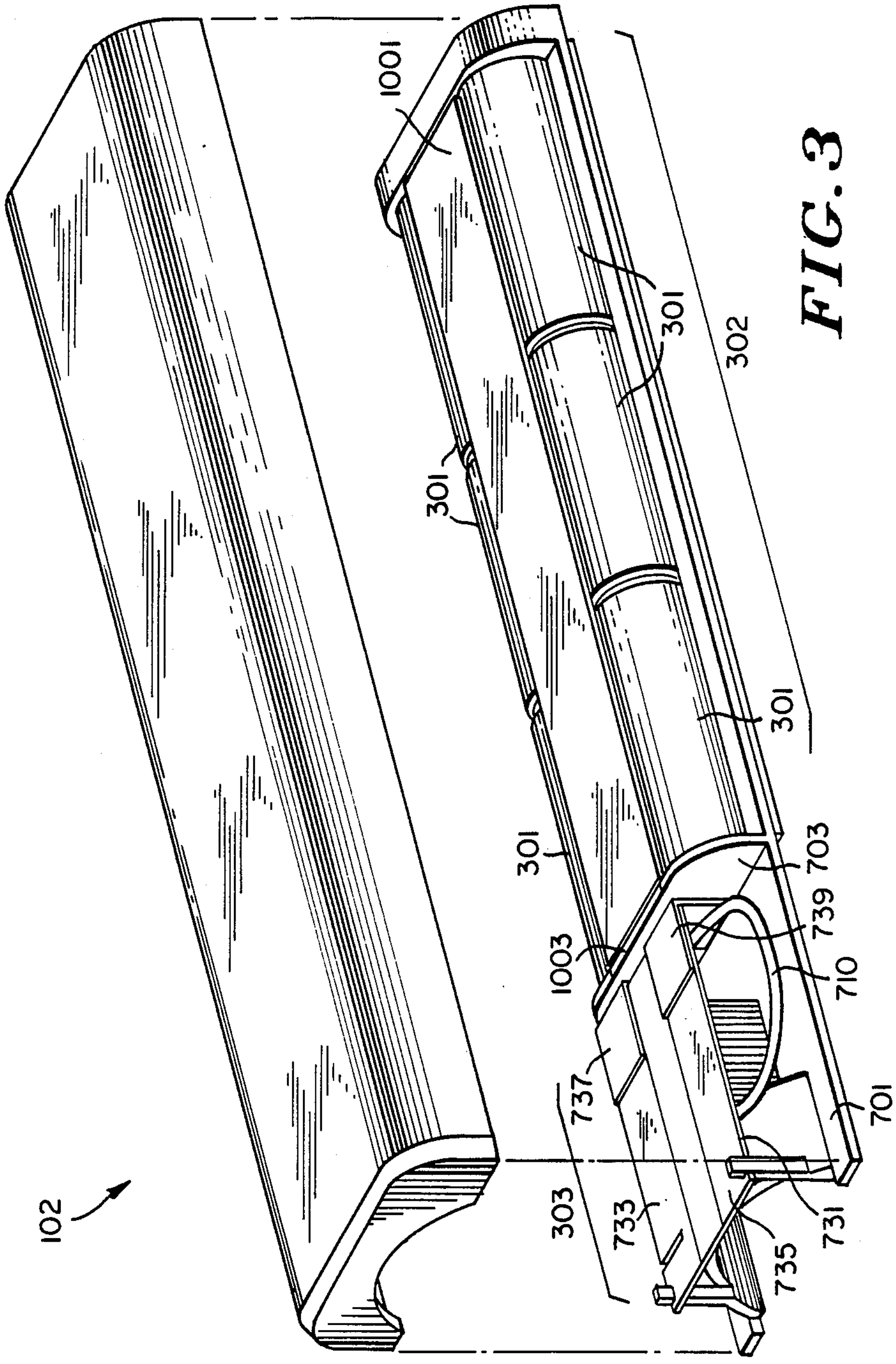
FIG. 3 is an exploded view of the battery portion which is detached from the radiotelephone of FIG. 1.

The battery portion 102, removed from the transceiver 100, is shown in FIG. 3 (with the outer surface cover separated from the rest of the battery portion). In the preferred embodiment, the battery comprises six electrochemical battery cells 301 (which may be connected in conventional form to provide power for the radio transceiver 100). Additionally, the battery cells 301 are enclosed in a part of a housing compartment 302 which may be constructed of plastic or similar non-conductive material having low dielectric loss which, in turn, may be partially covered with a conductive material on its inner surfaces. The remaining part of the battery housing may be dedicated to an antenna area 303 located in the top part of the battery portion 102 in the preferred embodiment. The metallization of the inner surfaces of the battery housing surrounding antenna portion 303 is electrically common with the metallization of the housing enclosing the battery cells 301 in the preferred embodiment. Additional metallization on the outer surface cover is not shown but may be utilized in the present invention.

One important aspect of the present invention is the decoupling of the grounded surfaces of the transceiver 100 and the antenna. A simplified representation of the ground portion of the transceiver 100 and the battery portion 102 is shown in the diagram of FIG. 4. An effective ground is realized at the bottom end of the transceiver 100 and the battery portion 102 Where the negative terminal 205 of the transceiver connects to battery cells 301'. A connection between the metallized part 403 of the battery portion 102 and the conductive part 405 of the transceiver 100 is made at this ground point.

Between the battery portion metallized part 403 and the transceiver conductive part 405 there exists the plastic housing material 409 of the battery portion 102 and the plastic housing material 411 of the transceiver 100. There is also an air gap 413 at least between the plastic material 409 and the plastic material 411. This structure can be considered a transmission line at the frequency of operation of the transceiver, in which the plastic materials 409 and 411 and the air gap 413 form the composite dielectric between two conductive planes (formed by metallized part 403 and conductive part 405). In the preferred embodiment, where the dielectric constant of the plastic is $\epsilon_{rl}=2.4$, the effective length of the "transmission line" is determined by the physical wavelength ($\lambda_g$) at the frequency of operation (800–900 MHz) in the composite dielectric:

$$\lambda_g = \lambda_o/\sqrt{\epsilon_{reff}}$$

$$\epsilon_{reff} \approx \frac{\epsilon_{r1}(d_1 + d_2 + d_3)}{d_1 + d_3 + \epsilon_{r1}\, d_2} = 1.95$$

where $d_2$ is the thickness of air gap 413, $d_1$ is the thickness of material 409, and $d_3$ is the thickness of material 411. Therefore, $\lambda_g/2 = 12.55$ cm. In a transceiver having a total length of approximately 19 cm, this places a virtual short circuit at approximately the top part o the battery cell compartment 302 and an open circuit at the top of the antenna area 303. Since this "transmission line" is loaded with the plastic dielectric, the electric fields are localized between the two conductors and little energy is radiated from it. Hence not much antenna efficiency is lost when the transceiver/battery combination is held in the hand.

The effective open circuit of the "transmission line" close to the antenna area 303 enables the utilization of a reactive ground antenna feed. The antenna of the preferred embodiment, then, is a reactive ground feed, two coupled resonators, foreshortened quarterwave microstrip antenna with air dielectric and deformed ground plane. This unique antenna and ground configuration produces an omni directional radiation pattern. In the preferred embodiment of a hand-held radiotelephone operating between 800 and 900 MHz, a physically small antenna size is realized for a given return loss bandwidth.

Figure 6:
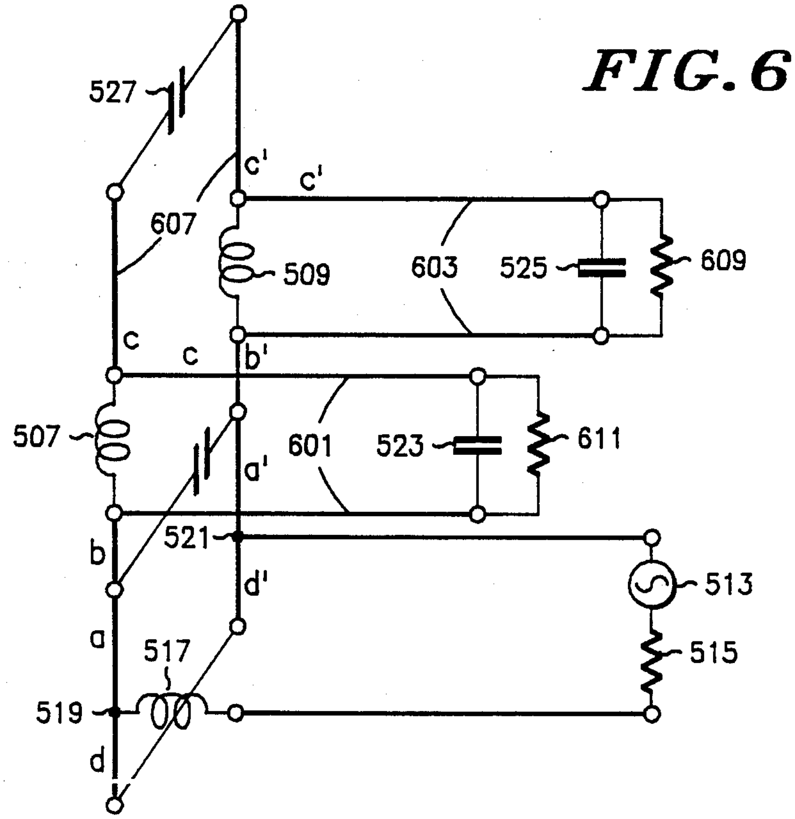
FIG. 6 is a schematic representation of the simplified antenna of FIG. 5.

A simplified version of the unique antenna of the present invention is described first in association with the physical representation of FIG. 5 and its equivalent circuit diagram of FIG. 6. A conductive surface 501 in FIG. 5 has two structures 503 and 505 suspended above the conductive surface 501. Structure 503 and structure 505 have different dimensions and, in combination with surface 501, form two microstrip transmission line resonators which are resonant at two separate frequencies. (In the preferred embodiment, the frequencies are 826 MHz and 904 MHz with a total 2:1 VSWR bandwidth of 100 MHz). Structure 503 is connected to surface 501 by means of a tab 507. Likewise, structure 505 is connected to surface 501 by means of a tab 509. At the frequencies of interest, tabs 507 and 509 may be modeled as series inductances.

Essentially between structures 503 and 505, a nonconductive notch 511 is cut in surface 501. It is well known that interruptions of predetermined dimensions in otherwise conductive surfaces will produce reactances to radio frequency signals and can be used as transmission lines. In the antenna of the present invention, a signal source 513 (having an internal resistance 515 and a feedline inductance 517) is connected to appropriate two-point connection points 519 and 521 on either side of notch 511. In general, there is a distance represented by a between connection point 519 and the edge of conductive surface 501 and a distance represented by a' between connection point 521 and the edge of conductive surface 501. There is also a distance (d +d') defining a path on conductive surface 501 between connection point 519 and 521 and notch end 522. There is another pair of distances (b and b') which define a path on surface 501 between the open end of notch 511 and the area of electrical connection of tab 507 and 509, respectively, to surface 501. Each pair of these distances can be analyzed as a transmission line.

Thus, a reactive ground feed for the antenna of the present invention can be defined by paths a→a', b→b', and d→d'. The antenna itself consists of the open circuit structures 503 and 505 which have paths c and c' respectively. These paths represent transmission line dimensions between the structures 503 and 505 and the conductive surface 501 which radiate as antennas. (It should be noted that an antenna is a reciprocal device which can transmit energy or receive energy. The term radiation, while implying transmission of energy by electromagnetic radiation, should also imply the capability of reciprocally receiving energy from electromagnetic radiation). The structures 503 and 505 also create a transmission line between themselves which may radiate at a frequency determined by the dimensions of the structures 503, 505 and the reactive notch length. In the preferred embodiment, this frequency is substantially below the two frequencies of interest; therefore, the interstructure 503–505 transmission line merely presents an effective impedance to the antenna.

The structures 503 and 505 may be capacitively loaded to the conductive surface 501 (as represented by capacitor 523 and capacitor 525, respectively). The primary focus of radiation from each resonator occurs at these capacitors. A capacitance 527 is also created between structures 503 and 505. Capacitor 527 is reflected back to the input of each structure as a shunt impedance.

Referring now to FIG. 6, the equivalent circuit for the physical structures of FIG. 5 can be related. Signal source 513 and its associated internal resistance feed a transmission line which is connected via series inductance 517 to connection points 519 and 521. Paths a→a' and b→b' may be modeled as sections of transmission lines as shown. Path d-d' is modeled as a shorted transmission line, which has the effect of placing a shunt inductance across feed connection points 519, 521.

Structure 503 is connected to the connection point 519 via inductance 507 and paths b and a and is modeled as a radiating transmission line 601 formed between dimension c and the conductive surface 501. Similarly, structure 505 is connected to connection point 521 via inductance 509 and paths b′ and a′ and is modeled as a radiating transmission line 603 formed between dimension c′ and the conductive surface 501. (Radiation resistance is shown as resistors 609 and 611). The transmission line between structures 501 and 503 is modeled as transmission line 607 between dimensions c and c′ and terminating in capacitance 527.

Figure 7:
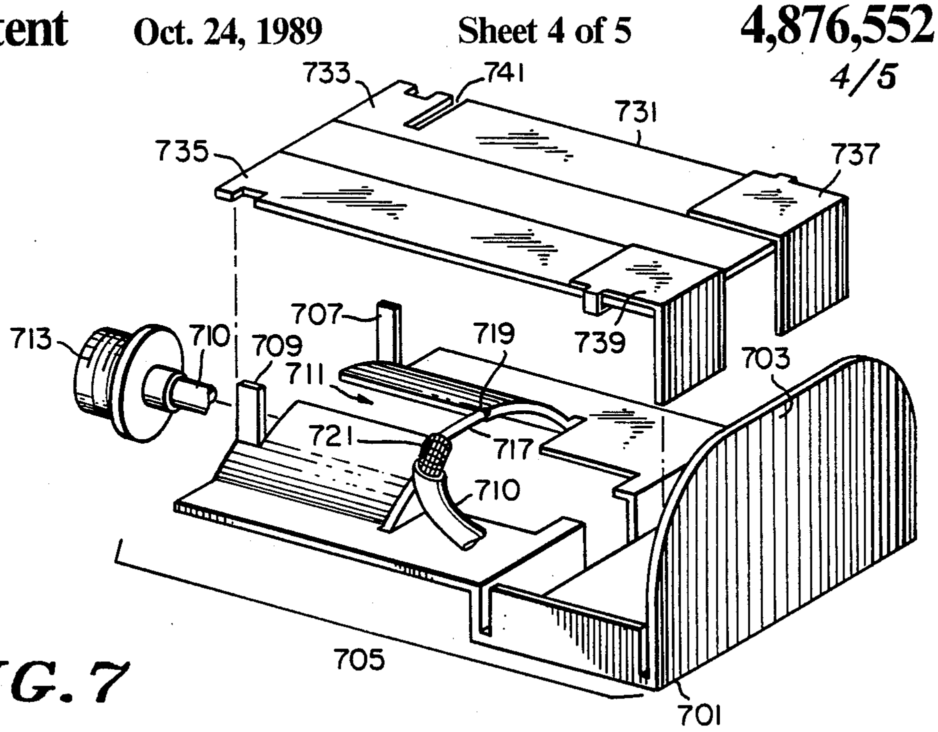
FIG. 7 is a diagram of a miniaturized, internally mounted broadband antenna which may employ the present invention.

The implementation of the antenna of the present invention in a cellular portable telephone battery is shown in the exploded view of FIG. 7. The conductive surface corresponding to conductive surface 501 is the deformed ground plate bracket 701, fabricated from high conductivity sheet metal which is contoured to the inner surface of the battery portion 102. This bracket 701 is roughly "L" shaped with a foot portion 703 and a leg portion 705. The leg portion 705 has a notch 711 which corresponds to the notch 511 of the simplified conductive surface 501. Tabs 707 and 709, which connect between the reactive ground feed and the resonant structures, are elevated portions of the bracket 701 and correspond to tabs 507 and 509 of the simplified version of FIG. 5.

A coaxial cable 710 is attached at one end to opposite sides of the notch 711 and connected, at the other end, to a coaxial connector 713 which mates with connector 209 of transceiver 100. This coaxial connection provides antenna input to the receiver of transceiver 100 and antenna output of the transmitter of transceiver 100. The coaxial cable 710 center conductor forms an inductor portion 717 (corresponding to inductor 517 of the model) which is connected to one side of notch 711 at connection point 719. The shielded portion of coaxial cable 710 is connected to the opposite side of notch 711 at connection point 721. In this fashion, the reactive ground feed of the present invention is realized in the battery portion of a portable transceiver.

The realization of structures 503 and 505 of FIG. 5 in the preferred embodiment is achieved as copper foil traces on a single sided glass epoxy printed circuit board 731. A copper foil trace 733 (corresponding to structure 503) is constructed so that it will be resonant at the transmit frequency band. (In the preferred embodiment, the transmit frequency band is approximately between 820 MHz and 845 MHz. The copper foil trace, therefore, is 4.2 cm long, 0.9 cm. wide, and 0.05 mm. thick on FR4 material). A second copper foil trace 735 (corresponding to structure 505) is constructed so that it will be resonant at the transmit frequency band. (In the preferred embodiment the receive frequency band is approximately between 870 MHz and 895 MHz. The copper foil trace is 4.2 cm. long, 0.9 cm wide, and 0.05 mm thick). At the open circuit end of the traces 733 and 735, conductive end flaps 737 and 739, respectively, are coupled to the traces and provide capacitive loading between the open circuit end of traces 733 and 735 and the grounded foot 703 of bracket 701. In this way, the capacitors 523 and 525 are realized. Radiation of the antenna is produced by the displacement current in one or the other capacitor 523 or 525 thereby providing polarization orthogonal to the gap. Thus, the radiation pattern of the antenna of the present invention is similar to that of a single resonator quarter wave antenna with a loading gap capacitor.

Figure 8:
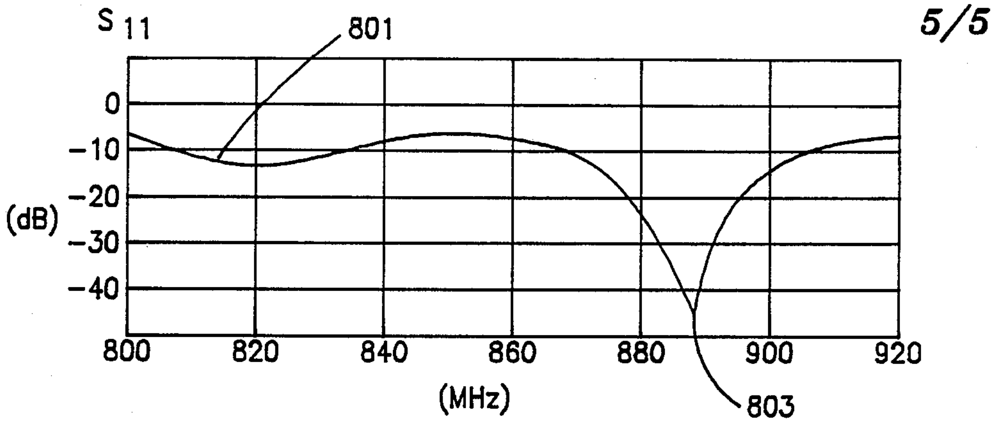
FIG. 8 is a frequency versus return loss graph of an antenna employing the present invention.

It is possible to adjust the antenna for minimum return loss by sliding end flaps 737 and 739 along the associated copper foil traces prior to the securing of the end flaps 737 and 739 to the traces during assembly. The lower frequency resonator 733 is loaded with an inductive notch 741 to make the gap between the end flaps 737 and 739 and the foot 703 essentially equal. In so doing, the radiation characteristics of each resonant foil trace are made similar. The spacing between the two foils 733 and 735, the thickness of the circuit board 731, and the spacing of the battery portion plastic cover determine the coupling between the resonators and thereby determine the minimum return loss between the return loss maxima 801 and 803 in FIG. 8. Since there is an optimum trace coupling and feed coax location combination for the widest return loss bandwidth, the best compromise thickness of the circuit board is between 0.05 and 0.1 cm.

The lower portion of the battery housing forms the antenna ground configuration. The construction of the unique combined antenna and battery can be apprehended from FIG. 3. In this view, the conductive metallization of the battery portion 102 is shown as a conductive strip 1001 extending the length of the battery compartment. In the preferred embodiment, this conductive strip 1001 is made of a thin copper strip adhesively attached to the battery cells 301. The conductive strip is connected to the foot 703 of the bracket 701 via a metallized portion of plastic 1003.

Figure 9:
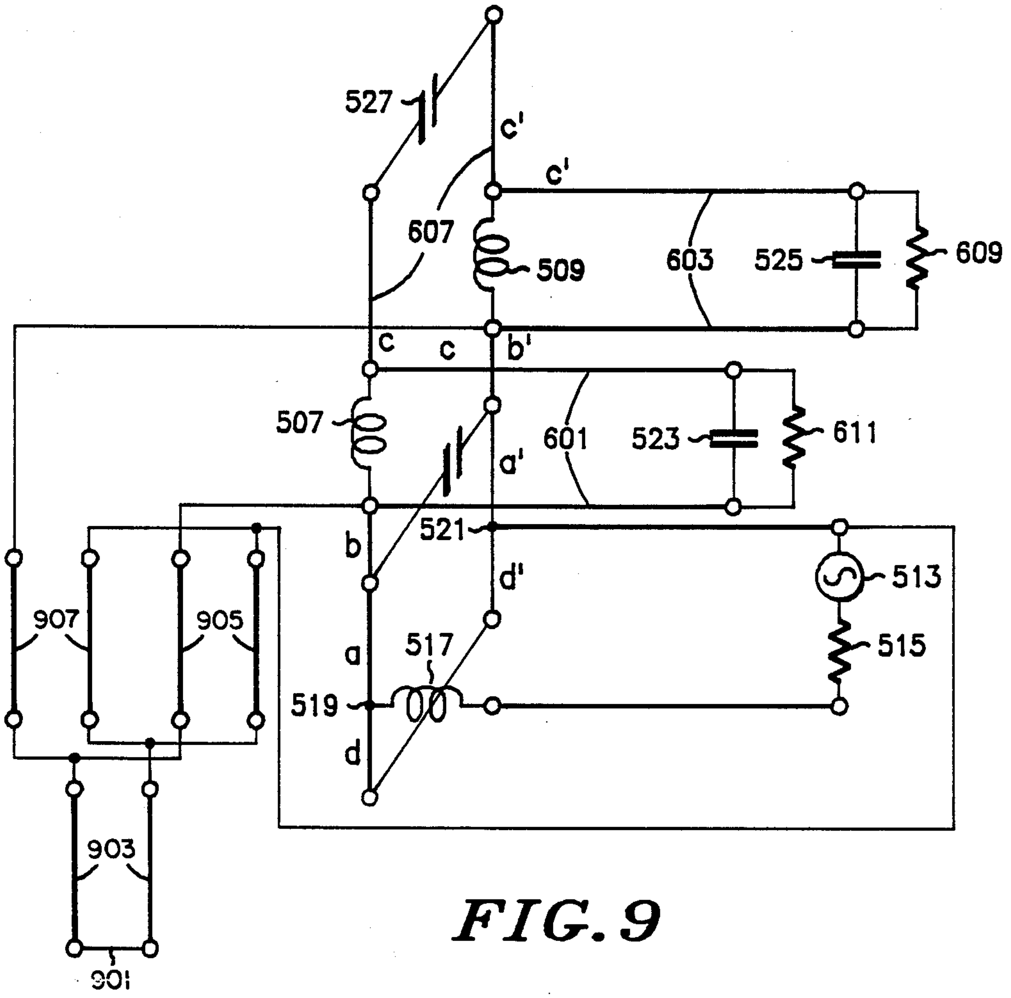
FIG. 9 is a schematic representation of an antenna and its associated reactive ground coupling which may be employed in the present invention.

The ground configuration of the present invention is modeled in the diagram of FIG. 9. As described previously, a gap between the transceiver 100 and the battery portion 102 form a transmission line resulting in a virtual short circuit at or near the top of the battery compartment. This virtual short circuit is modeled as a short circuit 901 across a transmission line 903. Transmission line 903 is that which is formed between the transceiver conductive part 405 and the battery portion metallized part 403. For purposes of analysis, the battery portion metallized part 403 includes the deformed ground plate bracket 701 up to but not including the portions on either side of the notch 711. The portions on either side of the notch 711 form two separate transmission lines 905 and 907 which independently decouple the feed points 719 and 721 (519 and 521 in the model) from the transceiver conductive part 405.

In summary, then, a miniature internally mounted broadband antenna for a portable transceiver has been shown and described. Two capacitively loaded antenna resonators, tuned to separate frequencies, are formed by copper foil traces on a printed circuit board which are transmission lines relative to a conductive reactive ground feed. The resonators are coupled to a conductive surface which is divided into two portions by a nonconductive notch. Coupling to the portable transceiver is accomplished at two points at symmetrically opposite locations across the notch. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

I claim:

1. A broadband reactive ground feed antenna comprising:

a conductive surface having a notch extending from a first edge of said conductive surface toward a second edge of said conductive surface thereby dividing said conductive surface into first and second portions about a center line of said notch;

a two-point antenna feed coupled to said first and second portions and disposed on symmetrically opposite sides of said notch thereby creating a reactive ground feed;

a first resonator comprising a microstrip transmission line coupled to said reactive ground feed, said first resonator microstrip transmission line having first and second ends and coupled at said first end to said first edge of said first portion, and a second resonator comprising a microstrip transmission line coupled to said reactive ground feed, said second resonator microstrip transmission line having first and second ends and coupled at said first end to said first edge of said second portion.

2. A broadband reactive ground feed antenna in accordance with claim 1 wherein said first resonator microstrip transmission line further comprises means for capacitively coupling said first resonator microstrip transmission line second end to said conductive surface.

3. A broadband reactive ground feed antenna in accordance with claim 1 wherein said second resonator microstrip transmission line second end further comprises means for capacitively coupling said second resonator microstrip transmission line second end to said conductive surface.

4. A broadband reactive ground feed antenna in accordance with claim 1 wherein said first resonator further comprises a copper foil trace on a printed circuit board.

5. A broadband reactive ground feed antenna in accordance with claim 1 wherein said second resonator further comprises a copper foil trace on a printed circuit board.

6. A broadband reactive ground feed antenna in accordance with claim 1 wherein said conductive surface further comprises first and second portions which are essentially symmetrical about a center line of said notch.

7. A broadband reactive ground feed antenna in accordance with claim 1 wherein said first resonator is tuned to a first frequency and said second resonator is tuned to a second frequency.

8. A broadband dual resonator reactive ground feed antenna for internal mounting in a radio transceiver, comprising:

a conductive ground bracket having a notch extending from a first edge of said conductive ground bracket toward a second edge of said conductive ground bracket and dividing said conductive ground bracket into first and second essentially symmetrical halves about a center line of said notch;

a reactive two-point antenna feed disposed on said conductive ground bracket at symmetrically opposite sides of said notch and spaced apart from the end of said notch a first copper foil trace forming microstrip transmission line resonator with said first half of said conductive ground bracket, coupled to said first antenna feed point and to said first essentially symmetrical half at said first edge, and resonant at a first resonant frequency; and a second copper foil trace forming a microstrip transmission line resonator with said second half of said conductive ground bracket, coupled to said second feed point and to said second essentially symmetrical half at said first edge, and resonant at a second resonant frequency.

* * * * *